No. 850,378. PATENTED APR. 16, 1907.
O. L. LARSON.
SMUT MACHINE.
APPLICATION FILED JAN. 29, 1906.
3 SHEETS—SHEET 1.
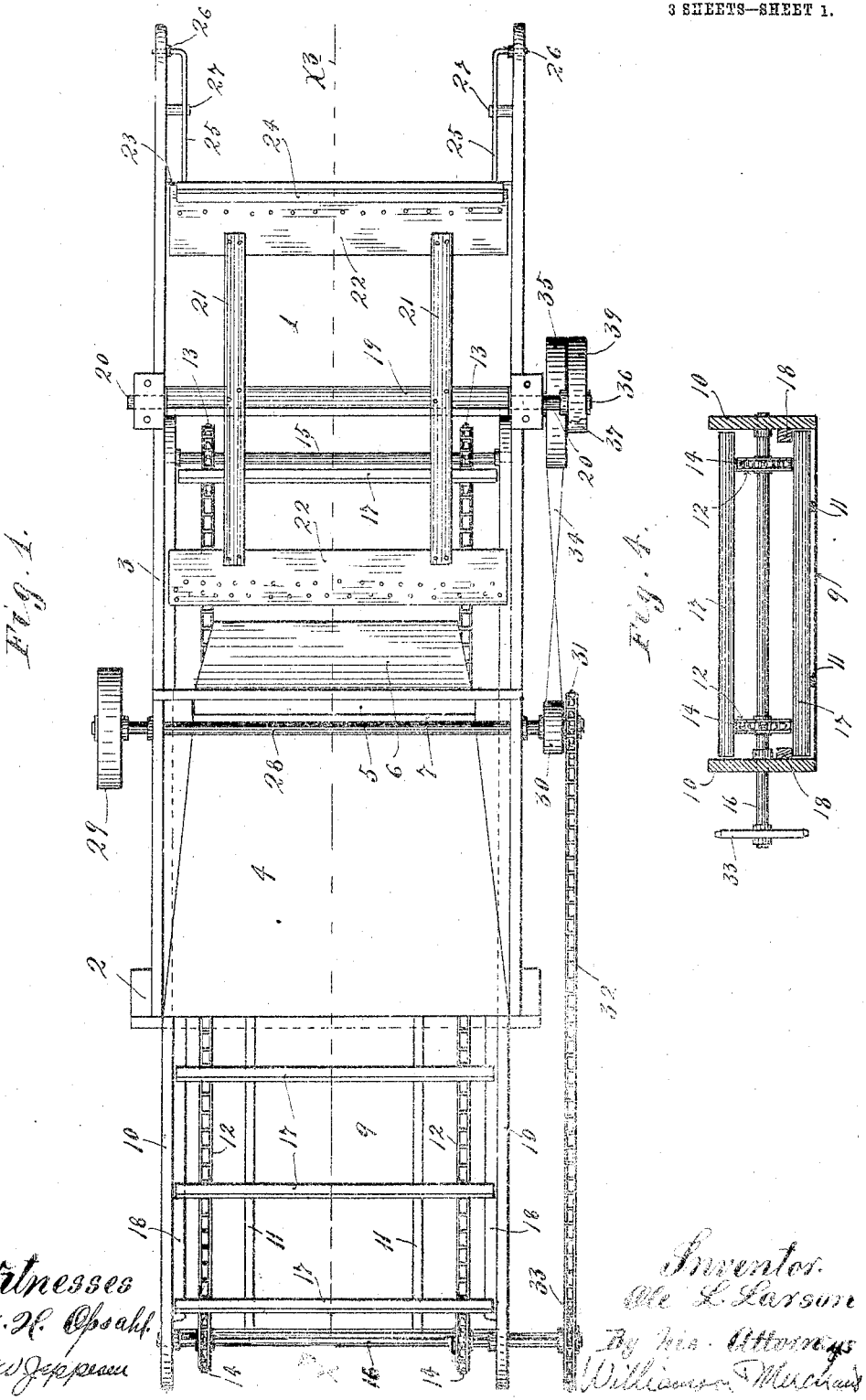
Witnesses
A. H. Opsahl
E. W. Jeppesen
Inventor
Ole L. Larson
By his Attorneys
Williamson Merchant

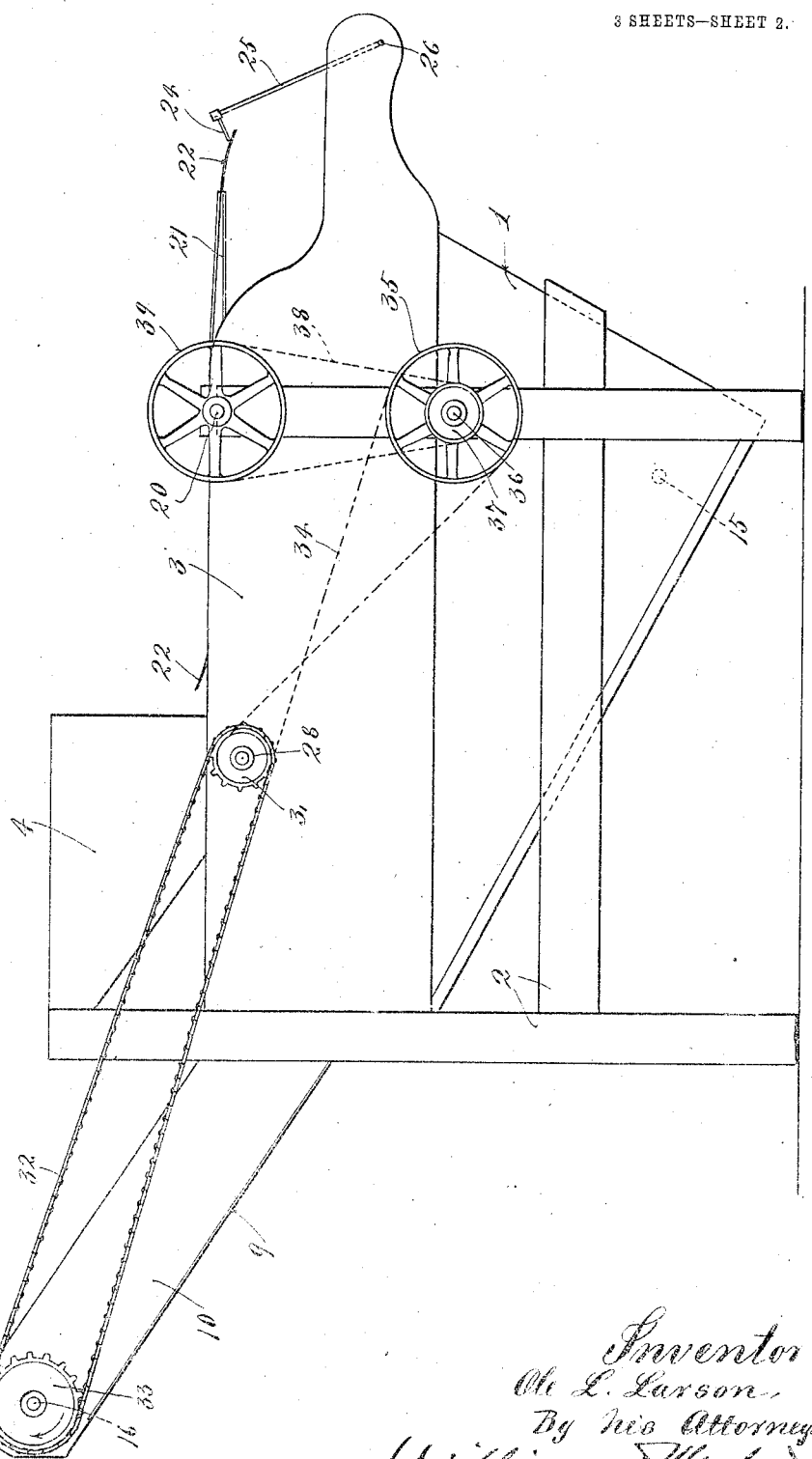

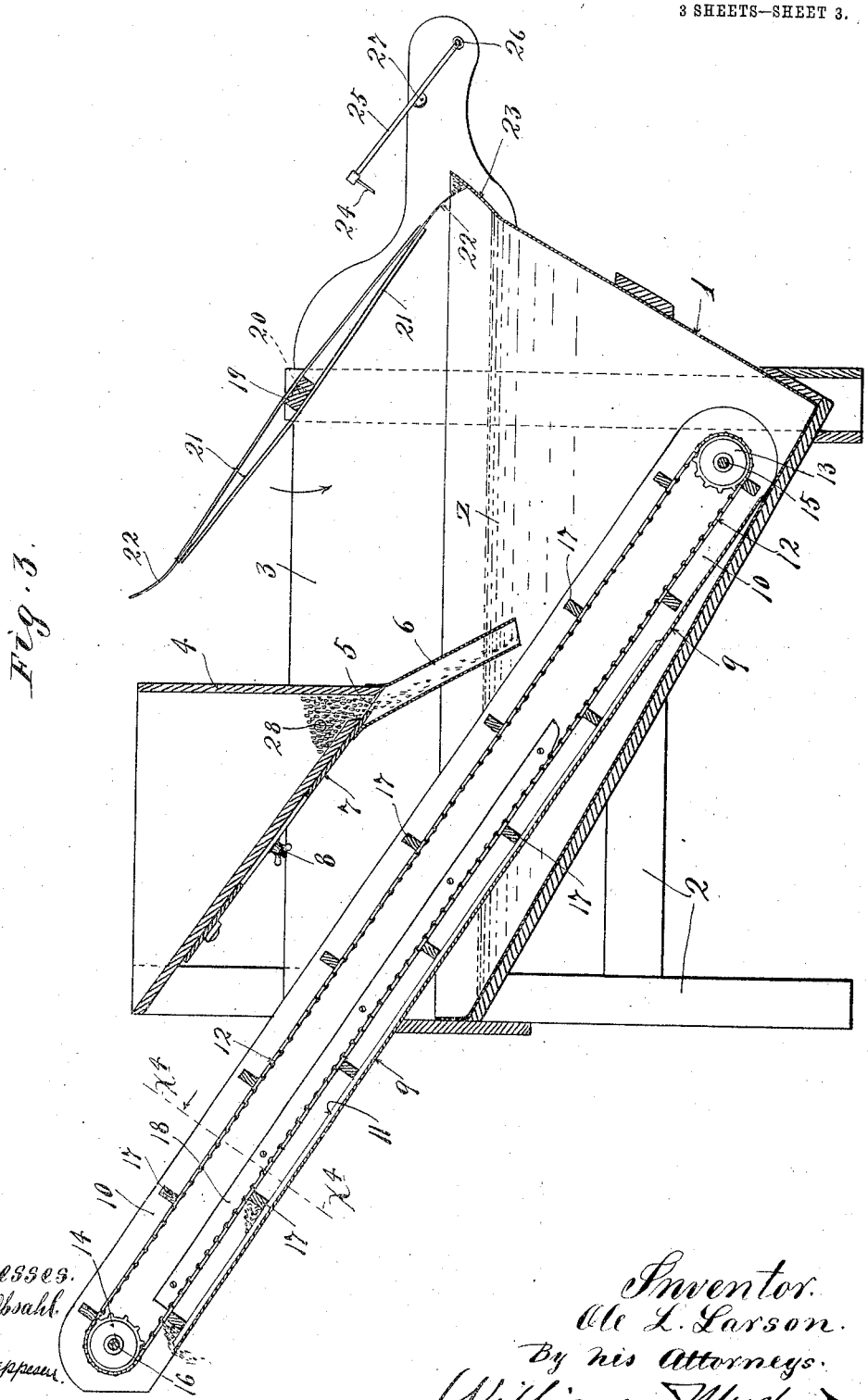

UNITED STATES PATENT OFFICE.

OLE L. LARSON, OF MINNEAPOLIS, MINNESOTA.

SMUT-MACHINE.

No. 850,378.   Specification of Letters Patent.   Patented April 16, 1907.

Application filed January 29, 1906. Serial No. 298,426.

*To all whom it may concern:*

Be it known that I, OLE L. LARSON, a citizen of the United States, residing at Minneapolis, in the county of Hennepin and State of Minnesota, have invented certain new and useful Improvements in Smut-Machines; and I do hereby declare the following to be a full, clear, and exact description of the invention, such as will enable others skilled in the art to which it appertains to make and use the same.

My invention has for its object to provide a simple, cheap, and efficient smut-machine for treating wheat and other grain with a solution of formaldehyde or other germ-destroying liquid; and to the above ends the invention consists of the novel devices and combinations of devices hereinafter described, and defined in the claims.

In the accompanying drawings, which illustrate my invention, like characters indicate like parts throughout the several views.

Figure 1 is a plan view of the improved machine. Fig. 2 is a side elevation of the same. Fig. 3 is a vertical section taken through the machine on the line $x^3$ $x^3$ of Fig. 1; and Fig. 4 is a detail in transverse section, taken on the line $x^4$ $x^4$ of Fig. 3.

The germ-destroying solution $z$ is contained in a hopper-like tank 1, that is supported by a framework 2 and, as shown, is provided with vertically-extended side boards 3. A seed box or hopper 4 is supported by the framework 2 and by the side-board extensions 3 with its downturned portion located above the intermediate portion of the hopper 1.

In the bottom of its lower portion the seed-hopper 4 is provided with a discharge-passage 5 and with a depending discharge-spout 6, that leads downward from said passage 5 and terminates below the level of the liquid $z$. The said discharge-passage 5 is adapted to be opened and closed to any desired extent by a cut-off gate that is slidably secured to the inclined bottom of said hopper by a thumb-nut and bolt 8 or other suitable device.

An inclined deck 9, having sides 10, is extended nearly to the bottom of the hopper-like liquid-tank 1, passes under the discharge-spout 6 and seed-hopper 4, and terminates at the rear of the frame 2. This inclined deck 9 and its sides 10 are imperforate, and the former is provided with longitudinally-extended cleats 11, for a purpose which will presently appear.

The numeral 12 indicates a pair of parallel laterally-spaced link belts or chains that run over sprockets 13 and 14, carried, respectively, by shafts 15 and 16, journaled in the lower and upper portions of the sides 10 of the inclined deck 9. The two chains 12 carry transverse slats 17, which as they are moved upward on the under side of the conveyer made up of said chains and slats rest upon and slide over the cleats 11 on the inclined deck 9. These cleats 11 hold the slats 17 slightly out of engagement with the inclined deck 9 and permit the water, which is raised with the grain, to run back into the tank, but do not space the said slats from the deck far enough to permit the treated grain to run back under the said slats. While the slats are performing their work of lifting the grain from the liquid in the tank to the upper end of the deck 9 the ends thereof pass under guide-strips 18 on the side boards 10 and are thereby held to their work against the cleats 11.

Mounted in suitable bearings in the side extensions 3, approximately above the lower portion of the endless conveyer made up of the chains 12 and slats 17, is a shaft 19, as shown, in the form of a bar, having projecting trunnions or rounded ends 20. To the intermediate portion of the shaft 19 is rigidly secured a pair of laterally-spaced diametrically-extended arms 21, each of which is shown as made up of a pair of slats. To the opposite ends of the arms 21 is secured a pair of skimmer-blades 22, which, as shown, are clamped between and rigidly secured to the ends of the slats that make up the said arms. These skimmer-blades 22 are preferably slightly flexible. They may be made of thin spring metal, or they may be provided at their edges with flexible strips. The edges of the skimmer-blades 22 are adapted to engage with a curved surface 23, formed on the upper portion of the inclined front plate of the tank 1.

The skimming-reel, made up of the blades 22, arms 21, and shaft 19, should be rotated in the direction of the arrow marked thereon in Fig. 3, and said blades serve to skim off from the upper portion of the liquid $z$ chaff and other light foreign materials which have been separated from the grain and to discharge the said chaff out of the tank. After the blades 22 have been moved out of the tank and have discharged the chaff they are brought into contact with a transversely-extended scraper-blade 24, which is carried by a pair of arms 25, loosely pivoted, at 26, to extensions of the side boards 3 and normally engaging with stops 27 on the said sideboard extensions. This scraper-blade 24 will yield and move upward when engaged by the skimmer-blades 22 and will permit the latter to freely pass, but will scrape the same clean of any chaff or foreign material which may adhere thereto.

The driving connections shown are as follows: The numeral 28 indicates a driving-shaft which is extended transversely through the machine and is mounted in suitable bearings in the sides of the seed-hopper 4. At one end the shaft 28 is provided with a pulley 29, and at its other end it is provided with a pulley 30 and sprocket 31. Motion may be imparted to the driving-shaft 28 by a power-driven belt, (not shown,) but which would run over the pulley 29. The numeral 32 indicates a sprocket-chain that runs over the sprocket 31 and over a sprocket 33 on one end of the shaft 16, and thus imparts motion from the shaft 28 to the endless conveyer made up of the chains 12 and slats 17. The numeral 34 indicates a crossed belt that runs over the pulley 30 and over a pulley 35, loose on a short shaft 36, fixed to one side of the frame 1. A smaller pulley 37 is fixed to rotate with the pulley 35. A belt 38 runs over the small pulley 37 and over a larger pulley 39, secured on one of the trunnions 20 of the skimmer-shaft 19, and thus provision is made for driving the skimming-reel at a relatively slow speed with respect to the driving-shaft 28.

The skimmer-blades 22 are preferably perforated, so as to allow the water to freely run therethrough from the screenings picked up by said blades.

I have found that in the treatment of oats and some other light grains they will not sink to the bottom of the tank containing the germ-destroying liquid, but will float on the liquid. In the treatment of these light grains the skimmer-blades 22 on their downward movement will positively force such light grains downward and cause the same to be completely submerged, but that such grain will mostly rise again to the surface after, however, having been completed with the germ-destroying solution, and hence properly treated. Under their upward movements the skimmer-blades will discharge the properly-treated floating grain in the same manner as heretofore stated with respect to the light floating particles or chaff.

What I claim, and desire to secure by Letters Patent of the United States, is as follows:

1. In a machine of the kind described, the combination with a tank and an inclined deck leading upward therefrom, of an endless conveyer having transversely-extended slats arranged to pass upward over said deck to elevate the grain from said tank, and means for holding said slats slightly above said deck when they are moved upward thereover, whereby the grain will be elevated by said slats and the water carried by the grain from the tank will be permitted to freely run backward and downward over the said inclined deck, substantially as described.

2. In a machine of the kind described, the combination with a tank, of means for delivering grain into said tank and for elevating the washed grain out thereof, a rotary skimming device having one or more blades for lifting the screenings or floating particles out of said tank, and a scraper normally lying in the path of movement of said skimmer-blade, and engageable therewith, to clean the same, substantially as described.

3. In a machine of the kind described, the combination with a tank, of means for delivering grain into said tank and for elevating the washed grain out thereof, a rotary skimming device having one or more blades for lifting the screenings or floating particles out of said tank, and a pivotally-movable scraper normally lying in the path of movement of said skimmer-blade and engageable therewith, to clean the same, substantially as described.

4. In a machine of the kind described, the combination with a tank adapted to contain a liquid, of a grain-supply hopper arranged to deliver into said tank, a rotary skimming-reel having blades arranged to pass downward into the liquid in the vicinity of the point where the grain is discharged from said hopper into said tank, and to pass upward and out of the liquid in said tank at one extremity of the tank, to thereby discharge floating particles from the tank, and a scraper arranged to engage with the blades of said reel as they are moved upward from said tank, substantially as described.

In testimony whereof I affix my signature in presence of two witnesses.

OLE L. LARSON.

Witnesses:
H. D. KILGORE,
F. D. MERCHANT.